March 25, 1952 — F. FREUDENSTEIN — 2,590,692
ADJUSTABLE VELOCITY-CONTROL MECHANISMS
Filed Feb. 23, 1950

INVENTOR
Ferdinand Freudenstein
By Joseph F. O'Brien
ATTORNEY.

Patented Mar. 25, 1952

2,590,692

UNITED STATES PATENT OFFICE 2,590,692

ADJUSTABLE VELOCITY-CONTROL MECHANISMS

Ferdinand Freudenstein, Buffalo, N. Y.

Application February 23, 1950, Serial No. 145,762

4 Claims. (Cl. 74—1)

This invention relates to adjustable velocity-control mechanisms.

Velocity-control mechanisms on the present-day market are formed to impart only a single given velocity-variation to the controlled member, or if such control mechanisms are at all adjustable they can be adjusted for limited velocity variations from the basic-type velocity function obtained in any given setting of the mechanism.

In industrial machines, instruments and the like, it is frequently desired to adjustably control and vary the velocity of the parts thereof. For example, in the metal-cutting industry, the velocity of cutting tools on automatic screw machines is controlled by cams driven from a common drive shaft. In general, a given velocity variation of the cutting tool, which in this case is obtained by the use of a specially-cut cam, is suitable for only one shape of resultant product. Whenever, therefore, more than one type of velocity control is to be imparted to a given part, a velocity control mechanism or means which is capable of controlling and imparting to the part whose velocity is to be controlled any velocity variation desired, presents advantages over devices at present on the market, and it is one of the objects or purposes of this invention to provide in a machine, instrument or the like, a mechanism or means for controlling the velocity of mechanical parts that will be guided, general in character and which, contrary to such devices at present on the market, may be adjusted to impart any desired velocity-variation to the part the velocity of which is to be controlled.

This invention is primarily based upon the principle or representation by Fourier, the French mathematician, which in simple form states that any continuous mathematical function can be represented by an infinite series consisting of sine and cosine terms, and another object of my invention is to provide an equivalent mechanical system which will permit any desired velocity function to be split up into a number of component sine and cosine velocity variations which are added algebraically.

Still another object of my invention is, in a device of the character specified, to utilize the scotch yoke which comprises the basic mechanical equivalent of sinusoidal motion.

Still another object of my invention is to provide a device of the character specified that may be employed as an educational exhibit.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which.

Figure 1:
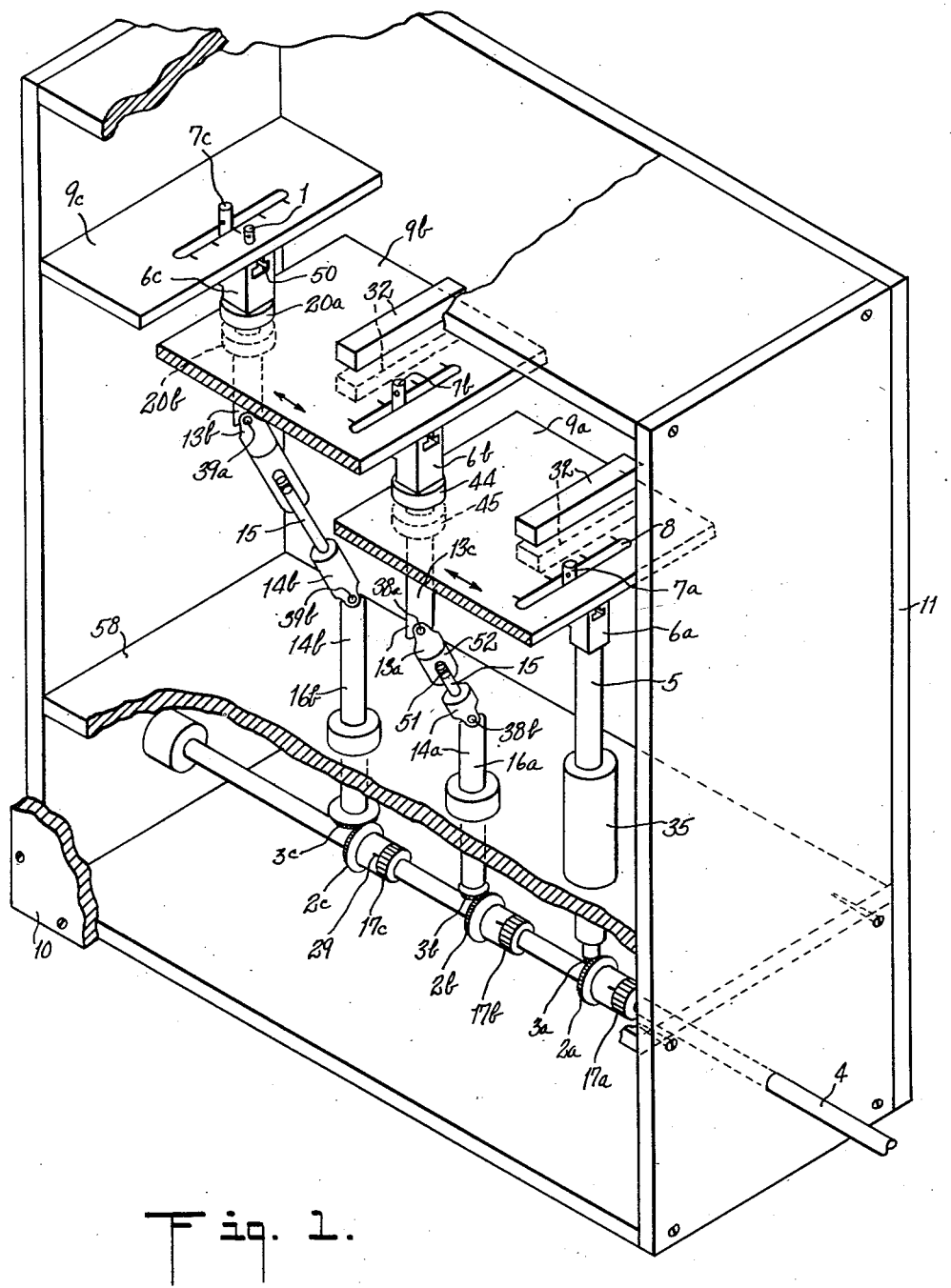
Fig. 1 is a view in perspective or oblique elevation of an adjustable velocity-control mechanism supported within a casing with the front cover removed.

In the accompanying drawings, one embodiment of my device or mechanism which discloses one particular form of application of the principle hereinabove specified is illustrated and comprises a device such as might be used in automatic machines and/or calculating mechanism, but this embodiment is intended in no way to limit the application of the broad invention to the particular device shown and described.

Referring now to the embodiment of my invention shown in these drawings, the pin 1 comprises the member whose velocity is to be controlled. A pair of bevel gears 2a and 3a having a velocity ratio of 1:3 respectively transmits velocity from the uniformly rotating shaft 4 to the vertical drive shaft 5 which in turn drives crank 6a which is secured thereto as hereinafter described. The crank pin 7a is slidably mounted on the crank 6a and moves in the straight slot 8 of the yoke 9a. Said yoke 9a and also other yokes hereinafter referred to are prevented from moving horizontally perpendicular to the main drive shaft axis by the front cover 10 shown in Fig. 5 and the rear cover 11. Yoke 9a will therefore be moving with a sinusoidal velocity variation provided that the drive shaft 4 is being rotated at a constant angular velocity and provided also that the forks 32a—33b are mounted parallel to each other and the forks 39a—39b are similarly mounted parallel to each other. This horizontal, sinusoidally varying motion is imparted to the upper vertical part 13c of joint 13a. This upper part of the joint, however, is also forced to rotate uniformly about its own geometrical center by means of the universal joints 13a—14a which are coupled to the drive shaft 4 by bevel gears 2b—3b of 2:1 velocity ratio respectively. Universal joints 13a and 14a are connected by the intermediate shaft 15 which is so mounted as to permit sliding therebetween of the two joints as will be hereinafter described in relation to Fig. 4. The middle crank 6b therefore has two motions, one being the sinusoidal straight line motion imparted to it by the yoke 9a and the other being rotation about the center of the upper middle point 13a. The resultant of this combined motion is transmitted to the middle yoke 9b which thus moves with the algebraic sum of two sinusoidally varying motions. This motion is in turn transmitted to the upper left vertical drive shaft 12b shown in Fig. 2. Said drive shaft 12b is likewise given an additional rotational velocity about its own geometrical center by the bevel gears 2c and 3c which comprises miter gears and are connected to the upper left vertical drive shaft 12b by the universal joints 13b and 14b; thus the upper left crank 6c imparts a horizontal velocity to the left yoke 9c which is the sum of three sinusoidal terms. Consequently the pin 1 will move with the velocity which in terms of the time $t$ is given by $A \sin(wt-a) + B \sin(2wt-b) + C \sin(3wt-c)$ where $w$ is the angular velocity of gears 2c and 3c; A, B and C are the amplitudes of motion corresponding to the positions of the crank pins 7c—7b—7a on the cranks 6c—6b—6a; and the phase angles $a$, $b$ and $c$ correspond to the relative angular positions of the shafts 6b—16a and 5. These can be adjusted as desired by varying the positions of the crank pins with respect to the cranks, the exact location being determined by a linear scale mounted on the yokes 9a—9b—9c. The relative angular positions of shafts 5—16a and 16b can be adjusted by rotation of bevel gears 2a—2b—2c and 3a—3b and 3c as will be hereinafter described. The resulting motion in this mechanism embodies six terms of the Fourier series to approximate the desired velocity function, and obviously the scheme can be extended to use any number of terms of the Fourier series and thus approximate the function as closely as desired subject only to the manufacturing accuracy required.

Figure 2:
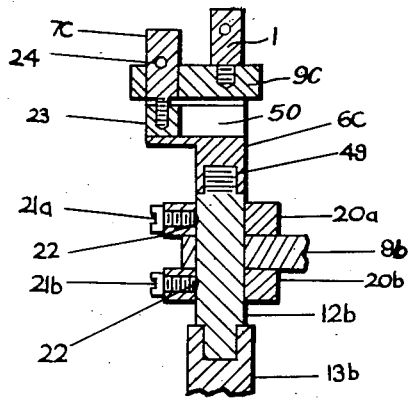
Fig. 2 is a section of the top yoke, crank, pin and assembly thereof.

From Fig. 2, the upper left vertical drive shaft 12b is press-fitted into the universal joint 13b. Bearing rings 20a, 20b are keyed to the upper left vertical drive shaft 12b by screws 21a, 21b which fit into a V-groove at 22. These rings prevent vertical motion of the yoke 9c. A similar purpose is achieved on the middle yoke 9b by the bearing rings 44—45 and similar bearing rings or shafts 16a—16b and 5 are shown at 46—47—48 in Figs. 3 and 6.

Crank 6c is screwed into shaft 12b and is driven from this thread at 49. Crank pin 7c is slidably mounted in this crank by means of the nut 23 which moves in T-slot 50 (see Fig. 1) and to which the pin is fastened where desired. A hole 24 permits tightening of the pin by means of a suitably sized rod and the same method is used for the other crank pins and shaft connections.

Figure 3:
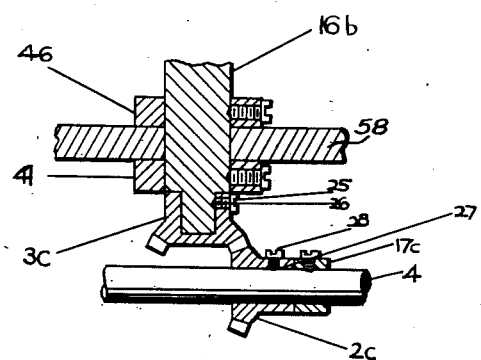
Fig. 3 is a section of the lower left gear drive.

In Fig. 3 a method of gear fastening and adjustment of the angular position of shaft 5—16a—16b is shown. The bevel gear 3c is fastened to the lower left vertical drive shaft 16b by screw 25 which seats in a V-groove at 26. The bevel gear 3c engages gear 2c which is similarly fastened to the main drive shaft 4 at 27 by screw 28. The graduated index ring 17c is also similarly fastened to the drive shaft 4. The bevel gear 2c has an index line 29 (see Fig. 1) inscribed on it showing its relative positions with respect to the index ring 17c. If the shafts 16a—16b and 5 are initially assembled with the cranks parallel and the indices are at zero, the angle as indicated by the index line will indicate relative angular displacement.

All three bevel gears are mounted and adjustable as described for the miter pair. Adjustment is made by loosening screw 28 and rotating bevel gear 2c while keeping the other shafts from rotating. This should be done starting with the shaft on the extreme right in Fig. 1.

Figure 4:
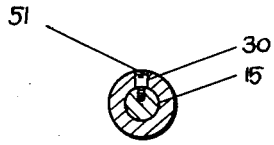
Fig. 4 is a section through an intermediate shaft connecting the universal joints embodied in my control mechanism.

In Fig. 4 intermediate shaft 15 is shown with pin 30 which rides in a straight groove 51 (see Fig. 1) permitting sliding between universal joints 13a and 14a. Pin 30 is screwed into the intermediate shaft 15 and it will be clear that only sliding without any rotation can occur between the universal joints. Joints 13b and 14b are similarly connected. Slot 51 is part of the universal joint extension 52 which is press-fitted to shaft 13a and intermediate shaft 15 is press-fitted into joint 14a.

Figure 5:
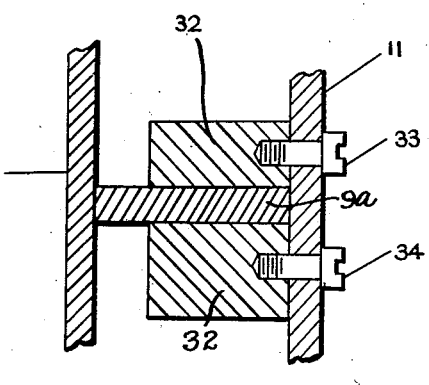
Fig. 5 is a section of the top and middle yokes shown in bearing position.

In Fig. 5 I have shown a method of support of the yokes 9b and 9c. The yoke shown is supported by bearing block 32 which is fastened to the back cover 11 by screws 33 and 34.

Figure 6:
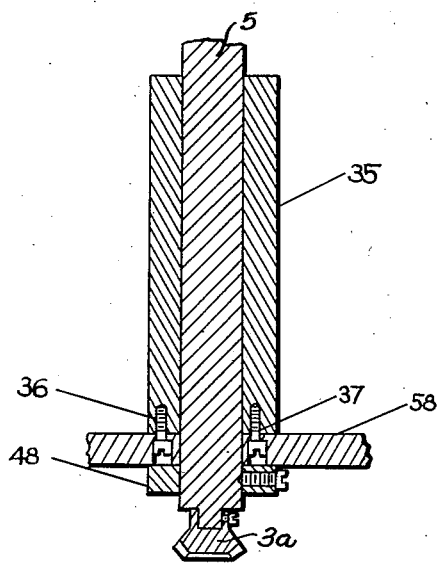
Fig. 6 is a section showing the right drive shaft sleeve bearing.

In Fig. 6 a right shaft bearing is shown which is longer than the rings 44 and 45 because of the greater length of the shaft 5. A sleeve bearing 35 is used as a bearing and fastened by screws 36 and 37 to the bottom bearing support-plate 58. The bottom shaft bearing 48 is similar in all respects to the bearing rings 20a—20b hereinabove described.

The operation of the device will be obvious from the above description.

Having described my invention, I claim:

1. An adjustable velocity-control mechanism comprising a main drive shaft and a plurality of auxiliary shafts arranged adjacent to each other, coupling means between said main drive shaft and auxiliary shafts for rotating the latter and embodying constant ratio-reduction members varying in angular velocity ratio to fit angular velocity terms of a series of sine and cosine terms, and to permit any desired velocity function to be split up into a series of sine and cosine velocity variations adapted to be added algebraically, said plurality of adjacent auxiliary shafts having a connection independently of the main shaft, said connection comprising a yoke member provided at one end with a slot, a crank member rigidly fastened to and having a driving connection with one of said auxiliary shafts, said crank member being adjustably mounted to slide in said slot to compel the yoke to move linearly in relation to the main shaft, supporting means for the yoke including bearings and fastening members guided by the bearings to permit movement in a direction parallel to the main shaft, said yoke having a connection with an adjacent auxiliary shaft which it is driving, whereby each yoke is connected to the crank member of one auxiliary shaft as well as to the other auxiliary shaft by a connection which acts as a bearing and a driving member.

2. An adjustable velocity control mechanism as claimed in claim 1 in which the auxiliary shafts comprising an extreme end shaft and a plurality of additional shafts and embody two constant-velocity joints for each auxiliary shaft except the extreme end shaft, and said two joints on each shaft being connected by a slidable intermediate shaft, and means for causing the additional shafts to move slidably parallel to the main shaft and also relatively to each other while the main shaft is rotating.

3. An adjustable velocity-control mechanism comprising a main drive shaft and a plurality of auxiliary shafts arranged adjacent to each other, coupling means between said main drive shaft and auxiliary shafts for rotating the latter and embodying constant ratio-reduction members varying in angular-velocity ratio to fit angular velocity terms of a series of sine and cosine terms, and to permit a desired velocity function to be split up into a series of sine and cosine velocity variations adapted to be added algebraically, said auxiliary shafts with constant ratio-reduction members including two constant-velocity joints for each auxiliary shaft except the extreme end shaft, said two joints on each shaft being connected by a slidable intermediate shaft, and said auxiliary shafts which embody constant velocity joints each being provided with a crank member, said plurality of adjacent auxiliary shafts having a connection independently of the main shaft, said connection comprising a yoke member provided at one end with a slot, a crank member rigidly fastened to and having a driving connection with one of said auxiliary shafts, said crank member being adjustably mounted to slide in said slot to compel the yoke to move linearly in relation to the main shaft, supporting means for the yoke including bearings and fastening members guided by the bearings to permit movement in a direction parallel to the main shaft, said yoke having a connection with an adjacent auxiliary shaft which it is driving, whereby each yoke is connected to the crank member of one auxiliary shaft as well as to the other auxiliary shaft by a connection which acts as a bearing and a driving member, means for causing the additional shafts to move slidably parallel to the main shaft and also relatively to each other while the main shaft is rotating, said connection having relative movements which impart a compound motion to the final driven element and the component contributed by each yoke will be one term in the Fourier development of the representation of velocity.

4. An adjustable velocity-control mechanism as claimed in claim 3 in which the auxiliary shafts having constant ratio reduction members including two constant-velocity joints are provided with adjustable pins slidably mounted therein, and each of said auxiliary shafts is also provided with a yoke driven by one of said slidably mounted and adjustable pins to move in one direction only, said main and each of the auxiliary shafts having a velocity ratio therebetween in which the angular velocity of the auxiliary shafts will form an arithmetic progression, either the first or last term of which will be equal to the angular velocity of the main drive shaft, and means will be provided for adjusting the relative angular phase difference between the auxiliary shafts.

FERDINAND FREUDENSTEIN.

REFERENCES CITED

The following references are of record in the file of this patent:

UNITED STATES PATENTS

| Number | Name | Date |
| --- | --- | --- |
| 487,441 | Finn | Dec. 6, 1892 |